United States Patent
Tanaka et al.

[11] Patent Number: 6,039,161
[45] Date of Patent: Mar. 21, 2000

[54] TWIN-CLUTCH DEVICE

[75] Inventors: Masanobu Tanaka, Hirakata; Hideyuki Imanaka, Moriguchi, both of Japan

[73] Assignee: Exedy Corporation, Osaka, Japan

[21] Appl. No.: 09/247,591

[22] Filed: Feb. 10, 1999

[30]   Foreign Application Priority Data

Feb. 19, 1998 [JP] Japan .................................. 10-037242

[51] Int. Cl.⁷ .............................. F16D 13/50; F16D 13/75
[52] U.S. Cl. .................................. 192/70.18; 192/70.21; 192/70.25; 192/70.28
[58] Field of Search .................................. 192/48.1, 48.7, 192/70.18, 70.21, 70.25, 70.28

[56]      References Cited

U.S. PATENT DOCUMENTS

| | | | |
|---|---|---|---|
| 2,354,829 | 8/1944 | Reed | 192/7.21 |
| 2,385,517 | 9/1945 | Hunt | 192/70.21 |
| 3,871,499 | 3/1975 | Kazuma | 192/70.18 X |
| 4,437,555 | 3/1984 | Tomm et al. | 192/70.21 |
| 4,640,399 | 2/1987 | Borjesson | 192/70.25 |
| 5,090,537 | 2/1992 | Fukuda | 192/70.18 X |

*Primary Examiner*—Rodney H. Bonck
*Attorney, Agent, or Firm*—Shinjyu Global IP Counselors, LLP

[57]   ABSTRACT

A twin-clutch device is provided that overcomes problems relating to a releasing property, a start property and a phase shift between clutch disks. The device includes first and second clutch disk assemblies 5 and 6, an intermediate plate 7, a clutch cover assembly 9, strap plates 16 and control mechanism. The intermediate plate 7 is disposed between the two clutch disk assemblies. The clutch cover assembly 9 has a pressure plate 17 and a diaphragm spring 18. The strap plates 16 bias the pressure plate 17 away from the flywheel 2. The control unit operates in a clutch switching operation to move the intermediate plate 7 at a slower speed than the pressure plate 17 upon start of movement of the pressure plate 17, and then to move both the intermediate plate 7 and the pressure plate 17 in synchronization with each other after the pressure plate 17 moves a distance corresponding to a predetermined stroke.

20 Claims, 5 Drawing Sheets

TWIN-CLUTCH DEVICE

BACKGROUND OF THE INVENTION

1. Field of the Invention

This invention generally relates to a twin-clutch device. More specifically, the present invention relates to a twin-clutch device for transmitting and intercepting power between a flywheel on an engine and a transmission.

2. Background Information

A twin-clutch device is used for ensuring a large torque transmission capacity within a limited space. The twin-clutch device has a first clutch disk assembly, a second clutch disk assembly and an intermediate plate disposed between the first and second clutch disk assemblies. The intermediate plate is non-rotatably but axially movable for engagement with a flywheel. The intermediate plate is provided with friction surfaces on both sides for abutting against the first and second clutch disk assemblies, respectively.

In engaging the clutch, a pressure plate is pushed toward the flywheel by a pushing member such as a diaphragm spring. The pressure plate engages the second clutch disk assemblies so that the first clutch disk assembly is pressed between the flywheel and the intermediate plate, and the second clutch disk assembly is pressed between the intermediate plate and the pressure plate. In releasing the clutch, the pressure from the pressure plate is released so that the intermediate plate is moved away from the flywheel by strap plates, and each of the clutch disk assemblies is released from the pressed or engaged state.

The releasing or disengaging operation of the twin-clutch device described above will now described below in more detail. In releasing the clutch, the pressure plate is first released from the pushing force and moves away from the intermediate plate. Thereby, the second clutch disk assembly attains the clutch-off state in which torque is not transmitted. When the pressure plate is moved away from the intermediate plate by a predetermined distance, pins fixed to the pressure plate are engaged with the intermediate plate, and thereafter the intermediate plate engaged with the pins moves away from the flywheel together with the pressure plate. Thereby, the first clutch disk assembly enters the clutch-off state. When engaging the clutch, operations are performed in a completely reverse manner.

FIG. 5 shows a relationship (i.e., clutch release characteristics) of distances of movement (i.e. lifts,) of the pressure plate and the intermediate plate with respect to a release stroke.

In a conventional twin-clutch device, a time lag T (see FIG. 5) is present between times when the pressure plate starts moving and when the intermediate plate starts moving. This time lag depends on the size of the space formed between an engagement portion of the above pin and the intermediate plate. It is preferable to increase the space to improve the clutch disengaging characteristics, but it is preferable to decrease the space to improve the start characteristics and the phase shift of the clutch disks.

In other words, when a similar situation happens during the clutch engagement, if the space (time lag) is large at the time of starting, the second clutch disk assembly is engaged after a predetermined time period from the time of the engagement of the first clutch assembly. That is, a two-stage engagement occurs, which makes it difficult to start smoothly. Regarding the phase shift between the clutch disks, intended torsion characteristics cannot be obtained if the space is large because the second clutch disk assembly starts the operation after the first clutch disk assembly is engaged and operates up to a predetermined torsion angle.

As can be understood from the above, it is very difficult in a conventional structure of a twin-clutch device to provide a clutch release characteristics satisfying all the requirements relating to disengagement of the clutches, the start property and the phase shift between the clutch disks.

In view of the above, there exists a need for a twin-clutch device which overcomes the above mentioned problems in the prior art. This invention addresses these needs in the prior art as well as other needs, which will become apparent to those skilled in the art from this disclosure.

SUMMARY OF THE INVENTION

An object of the invention is to solve the problems relating to the disengagement of the clutch, the start property and the phase shift between the clutch disks.

According to a first aspect of the invention, a twin-clutch device for transmitting and intercepting a power between a flywheel on an engine and a transmission includes first and second clutch disk assemblies, an intermediate plate, a pushing device, a first biasing member and control unit.

The first clutch disk assembly has a first friction member opposed to the flywheel. The second clutch disk assembly has a second friction member in a position opposed to the first friction member. The intermediate plate is unrotatably and axially movably attached to the flywheel, and is provided at its opposite side surfaces with friction surfaces for contact with the first and second friction members, respectively. The pushing device has a pressure plate having a friction surface opposed to the second friction member, and a pushing member for pushing the pressure plate toward the second friction member, and is fixed to the flywheel. The first biasing member is provided for biasing the pressure plate in a first direction away from the flywheel, and spacing from the intermediate plate the pressure plate released from a pushing force of the pushing device in a release operation. The control unit is provided for operating in a clutch switching operation to move the intermediate plate at a speed slower than a moving speed of the pressure plate when the pressure plate starts the movement, and move the intermediate plate and the pressure plate in a synchronized relationship after the pressure plate moves a distance corresponding to predetermined stroke.

When the above twin-clutch device is in the engaged state, the pushing device pushes the pressure plate toward the flywheel so that the first friction member is pressed between the flywheel and the intermediate plate, and the second friction member is pressed between the intermediate plate and the pressure plate.

When the pressure plate is released from the pushing force in the clutch release operation, the first biasing member moves the pressure plate away from the second friction member. At the same time, the intermediate plate moves away from the first friction member at a speed slower than the moving speed of the pressure plate. Thereby, the second clutch disk assembly attains the clutch-off state, and the first clutch disk assembly also attains the clutch-off state.

For engaging the clutch, the pushing member starts to move the pressure plate toward the flywheel and, at the same time, the intermediate plate starts to move toward the flywheel.

In this operation, the pressure plate and the intermediate plate simultaneously start the movement to start the operation of the two clutches at the same time. Therefore, no problem occurs in connection with the start property and the phase shift between the clutch disks. Since problems relating to the above do not occur, it is possible to ensure a large clutch release margin, and a problem of insufficient releasing of the clutch can be overcome.

According to a second aspect, the twin-clutch device of the first aspect further has such a feature that the control means includes a second biasing member, an engagement member and a third biasing member. The second biasing member biases the intermediate plate in a second direction opposite to the first direction. The engagement member is engaged with the intermediate plate for moving the intermediate plate in the first direction after the pressure plate moves a predetermined distance in the first direction. The third biasing member biases the intermediate plate in the first direction with a biasing force smaller than the pushing force of the pushing member and larger than the biasing force of the second biasing member.

In this device, the second biasing member biases the intermediate plate toward the flywheel. When the pushing force by the pushing device is released in the clutch release operation, the third biasing member spaces the intermediate plate from the flywheel. Thereby, the intermediate plate starts to move away from the flywheel simultaneously with the movement of the pressure plate. When the pressure plate moves a predetermined distance, the engagement member is engaged with the intermediate plate, and thereafter moves the same distance at the same speed as the pressure plate.

After the engagement member is engaged with the intermediate plate, a constant distance is kept between the intermediate plate and the pressure plate owing to biasing by the second biasing member.

According to a third aspect, the twin-clutch device of the first or second aspect further includes a friction compensation mechanism for providing a constant clutch release margin of the second clutch disk assembly.

According to a fourth aspect, the twin-clutch device of the second aspect further has such a feature that the engagement member is a pin having one end fixed to the pressure plate, a body portion extending through the intermediate plate toward the flywheel and the other end provided with a head larger in diameter than the body portion. A roll pin having one end for contact with the pressure plate and the other end for engagement with the head of the pin is pressure-inserted into a through-hole in the intermediate plate accommodating the pin such that the roll pin can be moved by the pressing force of the pressing member, and cannot be moved by the biasing forces of the first and third biasing members.

According to this device, when the pressure plate moves away from the intermediate plate in the clutch release operation, the pin moves together with the intermediate plate. When the pressure plate moves a predetermined distance, the head of the pin comes into contact with the roll pin. Since the roll pin is inserted into the through-hole in the intermediate plate under the pressure, the intermediate plate moves together with the pressure plate in the same direction when the pressure plate moves away from the flywheel after the pin comes into contact with the roll pin.

A space, which is formed between the head of the pin and the roll pin in the above operation, corresponds to the clutch release margin of the second clutch disk assembly.

When wearing occurs on the second friction member of the second clutch disk, the pressure plate and the pin move toward the flywheel. When the pressure plate moves, the roll pin moves the same distance toward the flywheel. Thereby, the space between the head of the pin and the roll pin, i.e., the clutch release margin of the second clutch disk assembly can be constant independently of the wear of the second friction member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
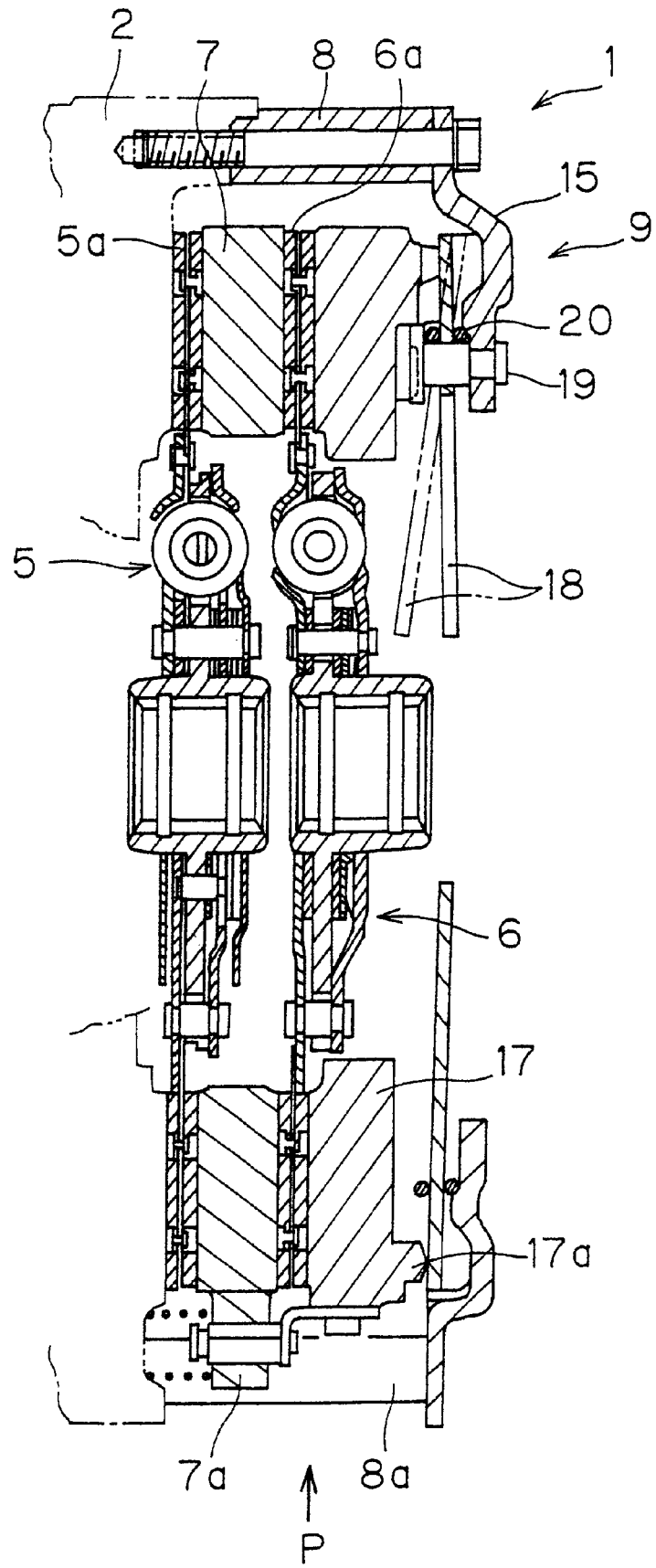
FIG. 1 is a schematic cross sectional view of a twin-clutch device in accordance with one embodiment of the present invention.
Figure 2:
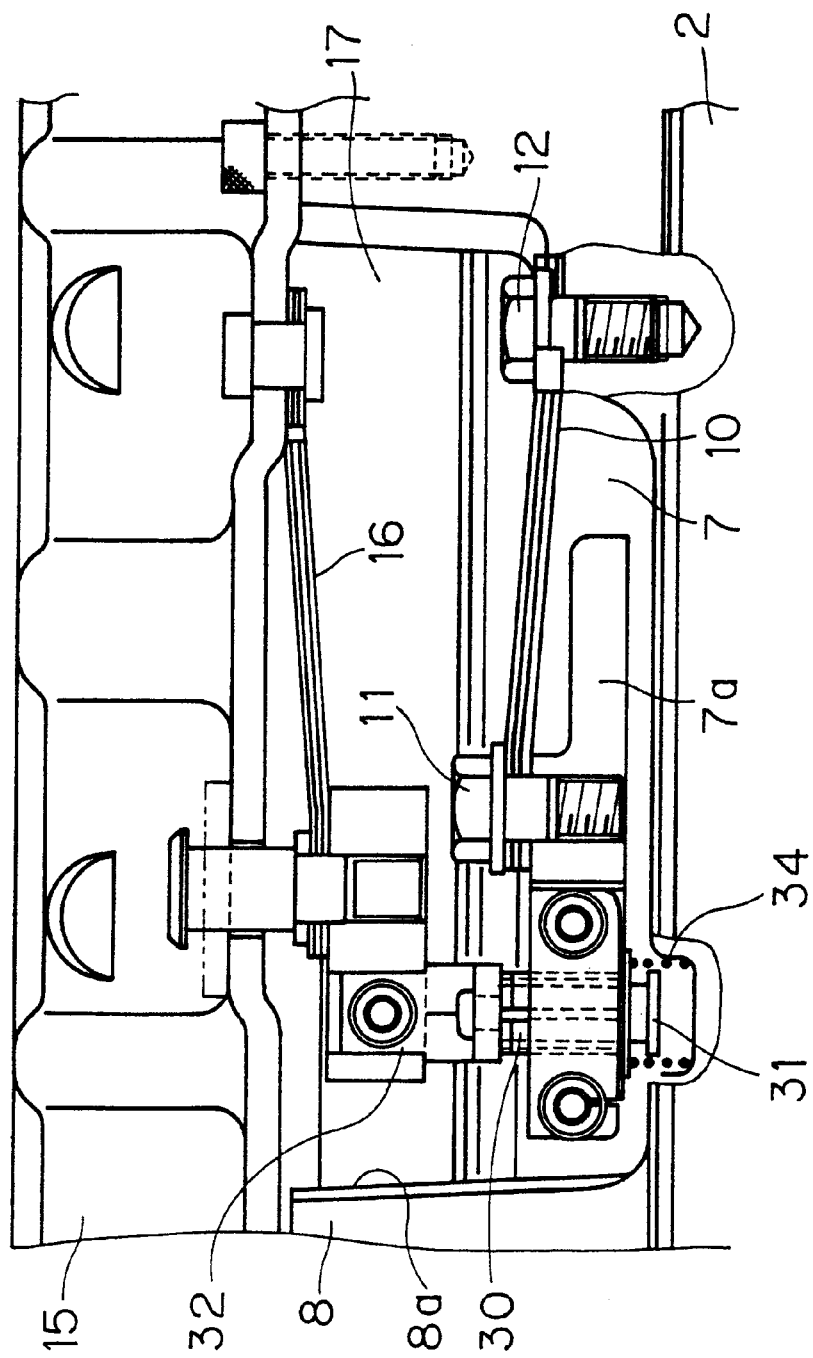
FIG. 2 is a partial edge elevational view of a twin-clutch device illustrated in FIG. 1 with selected portions broken away for purposes of illustration.
Figure 6:
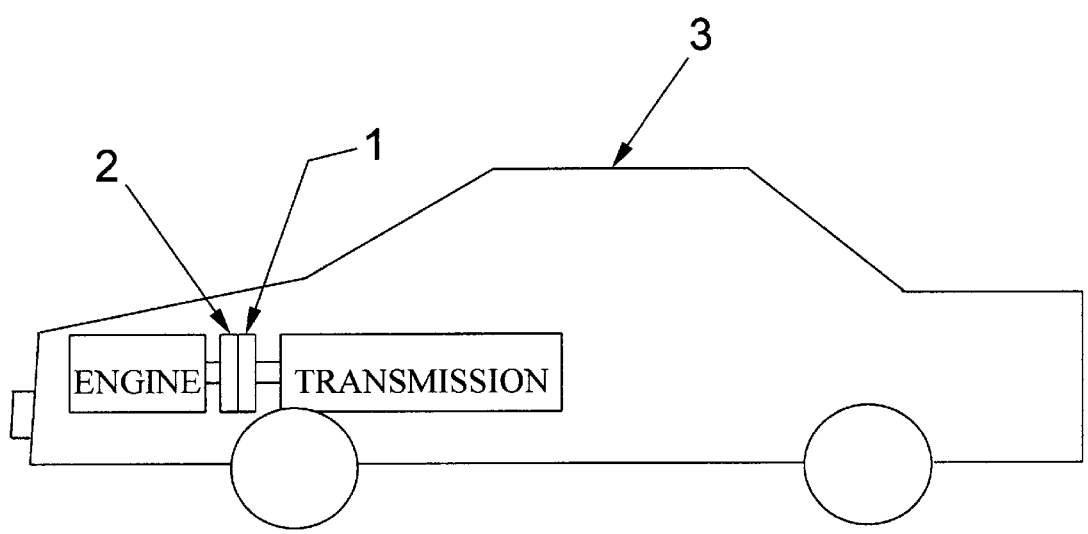
FIG. 6 is a diagrammatic view of a vehicle utilizing the twin-clutch between the engine and the transmission.

Referring initially to FIGS. 1, 2 and 6 a twin-clutch device 1 is disclosed in accordance with one embodiment of the present invention. The twin-clutch device 1 is employed in a vehicle 3 for transmitting and intercepting a torque between a flywheel 2 of an engine and a transmission input shaft (shown in broken lines in FIG. 1). The twin-clutch device 1 basically has a first clutch disk assembly 5, a second clutch disk assembly 6, an intermediate plate 7 disposed between the first and second clutch disk assemblies 5 and 6, a clutch cover assembly 9 fixedly coupled to the flywheel 2, a flywheel spacer 8, and strap plates 16.

Both of the first and second clutch disk assemblies 5 and 6 have dampening mechanisms for dampening torsional vibrations as is known in the art. The first and second clutch disk assemblies 5 and 6 have splined hubs that are engaged at their central portions with a splined input shaft (shown in broken lines in FIG. 1) of a transmission. The first and second clutch disk assemblies 5 and 6 are provided with friction members 5a and 6a, respectively, at their outer peripheral portions. The friction member 5a of the first clutch disk assembly 5 is opposed to friction surfaces of the flywheel 2 and the intermediate plate 7. The friction member 6a of the second clutch disk assembly 6 is opposed to a friction surface of the intermediate plate 7.

Figure 3:
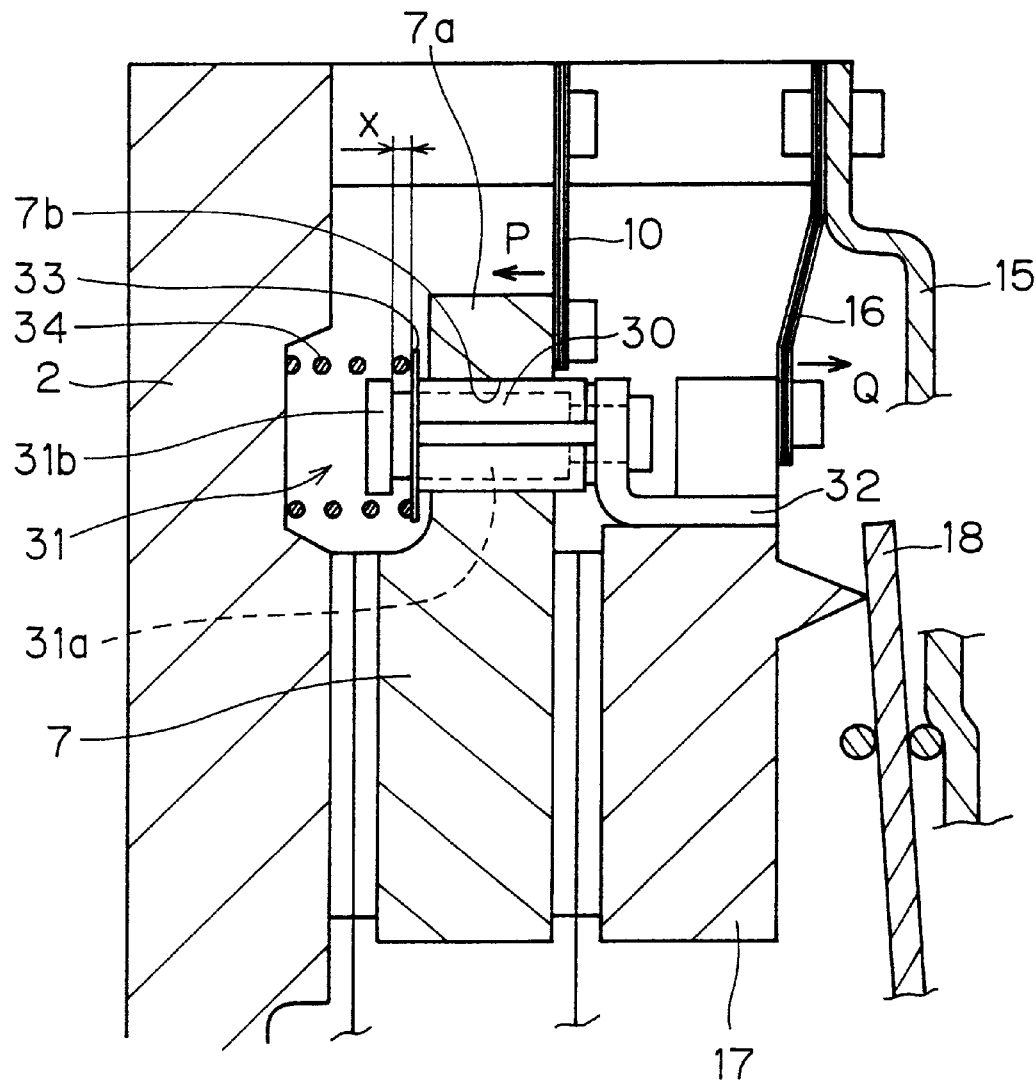
FIG. 3 is a partial schematic cross sectional view of a twin-clutch device illustrated in FIG. 1.

The intermediate plate 7 is formed as an annular plate that is located between the first and second clutch disk assemblies. The intermediate plate 7 is non-rotatably coupled to the flywheel 2, and axially movably fixed to the flywheel 2. The intermediate plate 7 has friction surfaces on both sides that face friction members 5a and 6a. As best seen in FIGS. 2 and 3, the intermediate plate 7 is provided at its outer periphery with a plurality of radial projections 7a. Each of the projections 7a extends through a recess 8a formed in the flywheel spacer 8.

As seen in FIGS. 2 and 3, the strap plates 16 are disposed inside the flywheel spacer 8. As shown in FIG. 3, the outer peripheries of the strap plates 16 are engaged with the clutch cover 15. The inner peripheries of the strap plates 16 are engaged with the pressure plate 17. Each of the strap plates 16 (see FIG. 3) biases the pressure plate 17 away from the flywheel 2, i.e., in a direction of an arrow Q as shown in FIG. 3.

The flywheel spacer 8 is disposed between the flywheel 2 and the clutch cover assembly 9. The flywheel spacer 8 includes a plurality of strap plates or second biasing members 10, a plurality of engagement pins 31 and a plurality of springs 34. In this embodiment, the flywheel spacer 8 further includes a plurality of roll pins or sleeves 30. The strap plates 10 bias the intermediate plate 7 close to the flywheel 2. The engagement pins 31 engage the intermediate plate 7 and move the intermediate plate 7 away from the flywheel 2 as the pressure plate 17 moves away from the flywheel 2 by more than a predetermined distance. The springs 34 bias the intermediate plate 7 away from the flywheel 2. The biasing force resulting from the springs 34 is smaller than a biasing force of the diaphragm spring 18. The biasing force resulting from the springs 34 is larger than the biasing force resulting form the strap plates 10 when the springs 34 are compressed, i.e., when the clutch device 1 is engaged. However, when the clutch device 1 is not engaged, the initial biasing force resulting from the springs 34 is smaller than the biasing force resulting from the strap plates 10. Of course, the combined biasing force resulting from the strap plates 16 and the springs 34 is larger than the biasing force resulting from strap plates 10.

As shown in FIG. 2, which is a view from the direction P in FIG. 1, one end of each of the strap plates 10 is fixedly coupled to each projection 7a of the intermediate plate 7 by a fixing bolt 11. The other ends of each of the strap plates 10 are fixedly coupled to the flywheel spacer 8 by fixing bolts 12. Therefore, the flywheel spacer 8 is fixedly coupled with the clutch cover assembly 9 and the flywheel 2.

Owing to the above structure, the intermediate plate 7 is non-rotatably and axially movably fixed to the flywheel 2 and the clutch cover assembly 9. The strap plates 10 function as a power transmission member between the intermediate plate 7 and the flywheel 2, and also function as a biasing member. As schematically shown in FIG. 3, the strap plates 10 continuously bias the intermediate plate 7 toward the flywheel 2, i.e., in the direction of an arrow P in FIG. 3.

The clutch cover assembly 9 basically includes the clutch cover 15, the pressure plate 17, and the diaphragm spring 18. The clutch cover 15 is fixedly coupled to the flywheel 2 via the flywheel spacer 8. The pressure plate 17 is non-rotatably and axially movably fixed to the clutch cover 15 via strap plates 16 (first biasing members). The diaphragm spring 18 engages the pressure plate 17 for pushing the pressure plate 17 toward the flywheel 2.

The pressure plate 17 has a friction surface facing the friction member 6a of the second clutch disk assembly 6, and also has a plurality of circumferentially spaced projections 17a that are arranged on the other surface which is opposite the friction surface, i.e., on the surface facing the transmission. These projections 17a support the outer periphery of the diaphragm spring 18. As seen in FIG. 1, a portion of the diaphragm spring 18 is supported by a plurality of stud pins 19 and a pair of wire rings 20.

An inner periphery of the diaphragm spring 18 can come into contact with a release device (not shown). When the release device moves the inner periphery of the diaphragm spring 18 toward the flywheel 2, a pushing force is released from the pressure plate 17.

The structure for releasing the intermediate plate 7 will now be described below in more detail. Each projection 7a of the intermediate plate 7 is provided with an axial through-hole 7b as shown in FIGS. 2 and 3. One of the roll pins 30 is pressure inserted into one of the through-holes 7b.

The roll pins or sleeves 30 are preferably pipe-shaped members. Each of the roll pins 30 has an end that is adapted to contact with the pressure plate 17. The other ends of the roll pins 30 are adapted to engage with the head portions of the pins 31. The roll pins 30 are pressure-inserted into through-holes 7b in the intermediate plate 7, where the pins 31 are inserted through. A part of the circumference of each roll pin 30 forms an axial recess. The roll pins 30 in their free states have outer diameters that are larger than the inner diameters of the through-holes 7b. Therefore, while the roll pins 30 are pressure-inserted into the through-holes 7b, a predetermined force is acting on the outer peripheries of the roll pins 30 and the inner peripheral surfaces of the through-holes 7b. The roll pins 30 do not move relative to the through-holes 7 unless frictional force therebetween does not exceed the predetermined force. That is, the roll pins 30 move axially with the pressing force of the diaphragm 18, but not with the biasing forces of the strap plates 16 or the springs 34. The roll pins 30 are longer than the through-holes 7b and have ends, which protrude from the ends of the projections 7a.

The engagement pins 31 are axially movably inserted into the roll pins 30. The ends of the engagement pins 31 that are close to the clutch cover 15 are fixedly coupled to the pressure plate 17 via arms 32. A body portion 31a of each of the engagement pins 31 extends through the intermediate plate 7 toward the flywheel 2. The other ends of the engagement pins 31 have head portions 31b that are larger in outer diameters than the body portions 31a. The head portions 31b have outer diameters that are larger than the inner diameters of the roll pins 30.

Spring seats 33 are arranged on the end surfaces of the roll pins 30 facing the flywheel 2. A spring 34 (third biasing member) is arranged between each spring seat 33 and the flywheel 2. While the clutch is engaged, a space X is formed between the heads 31b of the engagement pins 31 and the spring seats 33. This space X corresponds to a clutch release margin of the friction member 6a of the second clutch disk assembly 6. In the clutch engagement state, the springs 34 bias the intermediate plate 7 away from the flywheel 2 via the roll pins 30 by a biasing force larger than a biasing force of the strap plate 10. In the clutch released state, the biasing forces of the strap plates 10 toward the flywheel 2 exceed the biasing forces of the springs 34.

The other end surface of the roll pins 30 closer to the clutch cover 15 is in contact with the arms 32 that are fixedly coupled to the pressure plate 17.

The force for fitting the roll pins 30 into the through holes 7b is determined such that the biasing force applied by the strap plates 16 and the springs 34 toward the clutch cover 15 cannot axially move the roll pins 30, and the pushing force applied by the diaphragm spring 18 can move the roll pins 30 toward the flywheel 2.

The operation of twin-clutch device 1 will not be discussed in more detail. In the clutch engaged state, the diaphragm spring 18 pushes the pressure plate 17 toward the flywheel 2, and the intermediate plate 7 is likewise pushed toward the flywheel 2. In this state, the friction member 5a of the first clutch disk assembly 5 is pressed between the flywheel 2 and the intermediate plate 7, and the friction member 6a of the second clutch disk assembly 6 is pressed between the intermediate plate 7 and the pressure plate 17. Therefore, a torque is transmitted from the flywheel 2 to the transmission through both the clutch disk assemblies 5 and 6.

In accordance with an operation for releasing the twin-clutch device 1, the inner peripheral end of the diaphragm spring 18 is pushed toward the flywheel 2 so that the pushing force of the diaphragm spring 18 is released from the plates 7 and 17. Thereby, the strap plates 16 lift the pressure plate 17 toward the clutch cover 15. Thus, the pressure plate 17 moves away from the intermediate plate 7.

Figure 4:
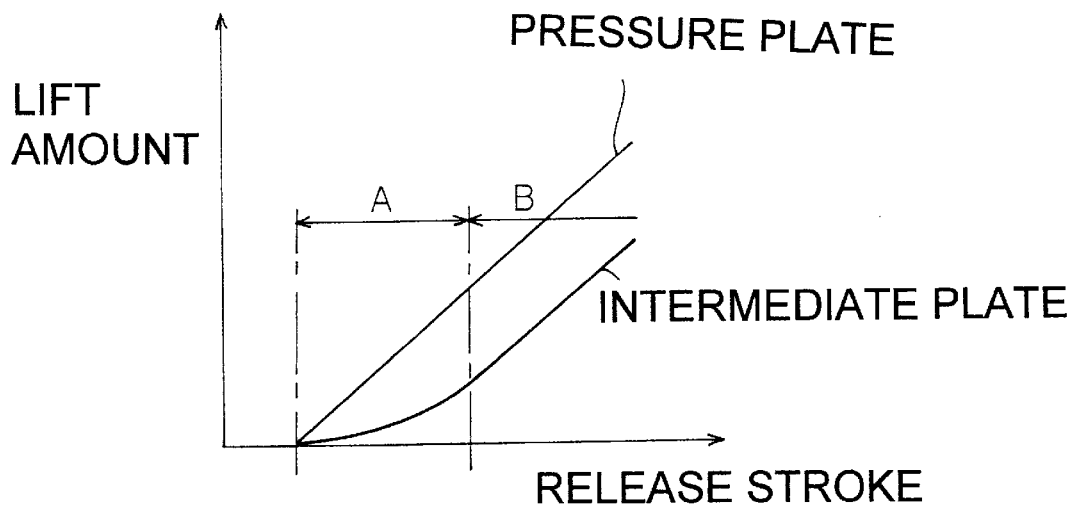
FIG. 4 is a graph showing the clutch release characteristics of a twin-clutch device constructed in accordance with the disclosed embodiment of the present invention.
Figure 5:
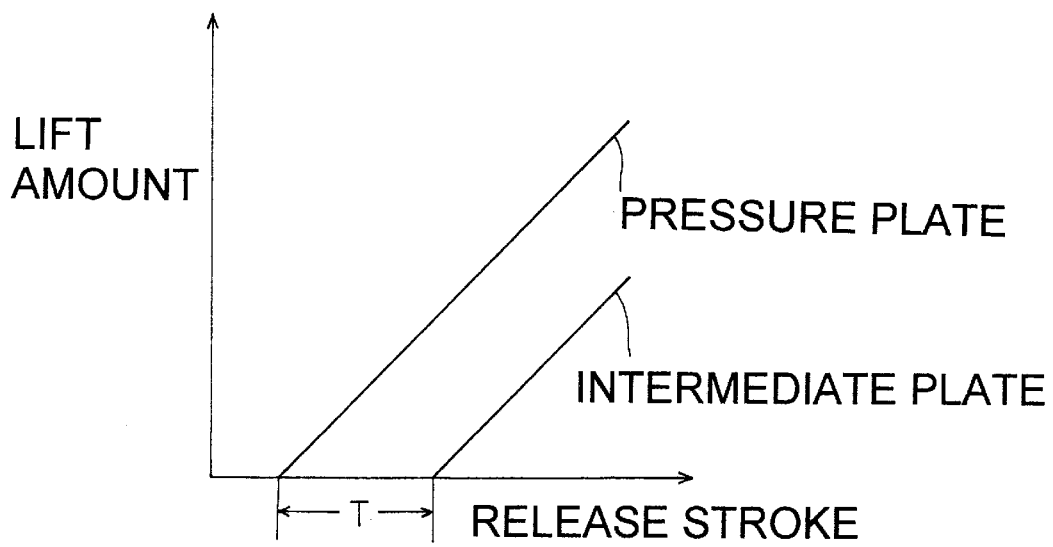
FIG. 5 is a graph showing the clutch release characteristics of a conventional twin-clutch device.

At the same time, the springs 34 move the intermediate plate 7 away from the flywheel 2. The biasing forces of the springs 34 and the strap plates 10 and 16 are determined such that the moving speed of the intermediate plate 7 is slower than the moving speed of the pressure plate 17. The foregoing state is shown in a region A of FIG. 4.

As the pressure plate 17 moves, the engagement pins 31 move. Since the moving speed of the intermediate plate 7 is slower than the moving speed of the pressure plate 17, the space X shown in FIG. 3 gradually decreases, and finally the head portions 31b of each engagement pin 31 come into contact with the spring seats 33. When the pressure plate 17 in the above state moves further, the intermediate plate 7 engaged with the engagement pins 31 move in synchronization with (i.e., at the same speed as) the pressure plate 17. The above state is shown in a region B of FIG. 4.

Upon engaging the twin-clutch device 1, the pressure plate 17 is moved toward the flywheel 2 against the biasing forces of the strap plates 16. Thereby, the intermediate plate 7 is released from the engagement pins 31, and therefore enters a state wherein the intermediate plate 7 can move toward the flywheel 2. In the clutch released state, the springs 34 expand and apply a small biasing force, and the strap plates 10 apply a large biasing force toward the flywheel 2. Therefore, the intermediate plate 7 moves toward the flywheel 2. The moving speed of the intermediate plate 7 is slower than the moving speed of the pressure plate 17. Accordingly, the arms 32 fixedly coupled to the pressure plate 17 come into contact with the other end surfaces of the roll pins 30, and thereafter the intermediate plate 7 is moved toward the flywheel 2 in synchronization with the pressure plate 17 by the pushing force of the diaphragm spring 18 without being affected by the biasing force of the springs 34.

In the clutch engaging operation, as described above, the pressure plate 17 and the intermediate plate 7 simultaneously move to engage the two clutches so that problems relating to two-stages engagement in and a phase shift between the clutch disks can be avoided.

As the friction member 5a of the first clutch disk assembly 5 wears, the intermediate plate 7 and the pressure plate 17 move or shift toward the flywheel 2. At the same time, the roll pins 30, engagement pins 31 and other parts move likewise. Accordingly, the clutch release margin X does not change.

As the friction member 6a of the second clutch disk assembly 6 wears, the pressure plate 17 moves toward the intermediate plate 7. Thereby, the arms 32 fixed to the pressure plate 17 push the end surfaces of the roll pins 30 toward the flywheel 2 so that each of the roll pins 30 slides in their respective through-holes 7b of the intermediate plate 7. In this case, the relationship between the end surfaces (spring seats 33) of each of the roll pins 30 and the heads of the corresponding engagement pins 31 does not change. Therefore, the clutch release margin does not change.

As described above, the friction member 6a of the second clutch disk assembly 6 does not affect the release margin X regardless of how much the friction members 5a and 6a wear.

Although the embodiment described above employs a diaphragm spring as a pushing device, the invention may be likewise applied to a structure employing coil springs as a pushing device.

Moreover, although the embodiment described above employs a release mechanism which pushes an inner periphery of the diaphragm spring toward the flywheel, the invention may be likewise applied to a device in which the inner periphery of the diaphragm spring is pulled toward the transmission for releasing the clutch.

According to the invention, as described above, the pressure plate and the intermediate plate simultaneously start the movement to start the operations of the two clutches at the same time. Therefore, smooth start can be achieved, and the problem of the phase shift between the clutch disks can be avoided. Since the problems described above can be avoided, a large clutch release margin can be ensured.

While only one embodiment has been chosen to illustrate the present invention, it will be readily apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A twin-clutch device for transmitting and intercepting power between a flywheel of an engine and a transmission shaft, comprising:

a first clutch disk assembly having a first friction member adapted to be positioned to face the flywheel;

a second clutch disk assembly having a second friction member in a position corresponding to said first friction member;

an intermediate plate located between said first and second clutch disk assemblies and adapted to be non-rotatably and axially movably coupled to the flywheel, said intermediate plate having friction surfaces on both sides for abutting against said first and second friction members;

a pushing device adapted to be fixedly coupled to the flywheel, said pushing device having a pressure plate and a pushing member, said pressure plate having a friction surface facing said second friction member, said pushing member operatively applying a biasing force on said pressure plate toward said second friction member in a clutch engaged position;

a first biasing member operatively coupled to said pressure plate to bias said pressure plate in a first direction away from the flywheel and said intermediate plate when said biasing force from said pushing device is released during a release operation; and control assembly operatively coupled to said intermediate plate, said control assembly operating in a clutch switching operation during movement between a clutch released position and said clutch engaged position, said control assembly operatively moves said intermediate plate in response to movement of said pressure plate at least during said releasing operation, such that said intermediate plate initially moves relative to the flywheel at a speed greater than zero and slower than a moving speed of said pressure plate and after said pressure plate has moved a distance corresponding to a predetermined stroke, said intermediate plate and said pressure plate move at identical speeds.

2. A twin-clutch device for transmitting and intercepting power between a flywheel of an engine and a transmission shaft, comprising:

a first clutch disk assembly having a first friction member adapted to be positioned to face the flywheel;

a second clutch disk assembly having a second friction member in a position corresponding to said first friction member;

an intermediate plate located between said first and second clutch disk assemblies and adapted to be non-rotatably and axially movably coupled to the flywheel, said intermediate plate having friction surfaces on both sides for abutting against said first and second friction members;

a pushing device adapted to be fixedly coupled to the flywheel, said pushing device having a pressure plate and a pushing member, said pressure plate having a friction surface facing said second friction member, said pushing member operatively applying a biasing force on said pressure plate toward said second friction member in a clutch engaged position;

a first biasing member operatively coupled to said pressure plate to bias said pressure plate in a first direction away from the flywheel and said intermediate plate when said biasing force from said pushing device is released during a release operation; and control assembly operatively coupled to said intermediate plate, said control assembly operating in a clutch switching operation during movement between a clutch released position and said clutch engaged position, said control assembly operatively moves said intermediate plate in response to movement of said pressure plate, such that said intermediate plate initially moves at a speed slower than a moving speed of said pressure plate and after said pressure plate has moved a distance corresponding to a predetermined stroke, said intermediate plate and said pressure plate move at identical speeds, said control assembly includes:

a second biasing member operatively coupled to said intermediate plate to apply a biasing force to said intermediate plate in a second direction which is opposite said first direction;

an engagement member operatively engaged with said intermediate plate to move said intermediate plate in said first direction after said pressure plate moves said predetermined distance in said first direction; and a third biasing member operatively coupled to said intermediate plate to apply a biasing force to said intermediate plate in said first direction, said biasing force of said third biasing member being smaller than said biasing force of said pushing member and larger than said biasing force of said second biasing member when in said clutch engaged position.

3. A twin-clutch device as set forth in claim 2, further comprising
a friction compensation means for providing a constant clutch release margin in said second clutch disk assembly.

4. A twin-clutch device as set forth in claim 1, further comprising
a friction compensation means for providing a constant clutch release margin in said second clutch disk assembly.

5. A twin-clutch device as set forth in claim 2, wherein
said engagement member includes a pin having a first end fixedly coupled to said pressure plate, a body portion extending through said intermediate plate toward the flywheel and a second end provided with a head portion larger in diameter than said body portion; and said intermediate plates have a sleeve with a first end adapted to contact with said pressure plate and a second end adapted to engage with said head portion of said pin, said sleeve being pressure-inserted into a through-hole in said intermediate plate with said pin located within said sleeve such that said sleeve is axially movable by a pressing force of said pressing member and axially non-movable by said biasing forces of said first and third biasing members.

6. A twin-clutch device as set forth in claim 5, wherein
said biasing forces of said first biasing member, said second biasing member, and said third biasing member are predetermined relative to each other such that said intermediate plate moves at a speed that is slower than the moving speed of said pressure plate when said pressure plate starts moving.

7. A twin-clutch device as set forth in claim 6, wherein
said sleeve has a spring seat on an end facing the flywheel; and said pin and said spring seat are disposed such that there is a predetermined axial gap between said head portion of said pin and said spring seat when said pressure plate is closest to the flywheel.

8. A twin-clutch device as set forth in claim 5, wherein
said sleeve has a spring seat on an end facing the flywheel; and said pin and said spring seat are disposed such that there is a predetermined axial gap between said head portion of said pin and said spring seat when said pressure plate is closest to the flywheel.

9. A twin-clutch device as set forth in claim 8, wherein
said intermediate plate further includes a plurality of projections on an outer periphery that are engaged with said control assembly.

10. A twin-clutch device as set forth in claim 7, wherein
said intermediate plate further includes a plurality of projections on an outer periphery that are engaged with said control assembly.

11. A vehicle comprising:

an engine having a flywheel;

a transmission with an input shaft; and a twin-clutch device for transmitting and intercepting power between said flywheel of said engine and said transmission, said twin-clutch device comprising a first clutch disk assembly having a first friction member facing said flywheel;

a second clutch disk assembly having a second friction member in a position corresponding to said first friction member;

an intermediate plate located between said first and second clutch disk assemblies, said intermediate plate being unrotatably and axially movably attached to said flywheel, said intermediate plate having friction surfaces on both sides for abutting against said first and second friction members;

a pushing device fixedly coupled to said flywheel and having a pressure plate and a pushing member, with said pressure plate having a friction surface facing said second friction member, said pushing member operatively applying a biasing force on said pressure plate toward said second friction member in a clutch engaged position;
a first biasing member operatively coupled to said pressure plate to bias said pressure plate in a first direction away from said flywheel and said intermediate plate when said biasing force from said pushing device is released during a release operation; and
control assembly operatively coupled to said intermediate plate, said control assembly operating in a clutch switching operation during movement between a clutch released position and said clutch engaged position, said control assembly operatively moves said intermediate plate in response to movement of pressure plate at least during said releasing operation, such that said intermediate plate initially moves relative to the flywheel at a speed grater than zero and slower than a moving speed of said pressure plate and after said pressure plate has moved a distance corresponding to a predetermined stroke, said intermediate plate and said pressure plate move at identical speeds.

12. A vehicle comprising:
an engine having a flywheel;
a transmission with an input shaft; and
a twin-clutch device for transmitting and intercepting power between said flywheel of said engine and said transmission, said twin-clutch device comprising
a first clutch disk assembly having a first friction member facing said flywheel;
a second clutch disk assembly having a second friction member in a position corresponding to said first friction member;
an intermediate plate located between said first and second clutch disk assemblies, said intermediate plate being unrotatably and axially movably attached to said flywheel, said intermediate plate having friction surfaces on both sides for abutting against said first and second friction members;
a pushing device fixedly coupled to said flywheel and having a pressure plate and a pushing member, with said pressure plate having a friction surface facing said second friction member, said pushing member operatively applying a biasing force on said pressure plate toward said second friction member in a clutch engaged position;
a first biasing member operatively coupled to said pressure plate to bias said pressure plate in a first direction away from said flywheel and said intermediate plate when said biasing force from said pushing device is released during a release operation; and
control assembly operatively coupled to said intermediate plate, said control assembly operating in a clutch switching operation during movement between a clutch released position and said clutch engaged position, said control assembly operatively moves said intermediate plate in response to movement of pressure plate, such that said intermediate plate initially moves at a speed slower than a moving speed of said pressure plate and after said pressure plate has moved a distance corresponding to a predetermined stroke, said intermediate plate and said pressure plate move at identical speeds,
said control assembly includes:
a second biasing member operatively coupled to said intermediate plate to apply a biasing force to said intermediate plate in a second direction which is opposite said first direction;
an engagement member operatively engaged with said intermediate plate to move said intermediate plate in said first direction after said pressure plate moves said predetermined distance in said first direction; and
a third biasing member operatively coupled to said intermediate plate to apply a biasing force to said intermediate plate in said first direction, said biasing force of said third biasing member being smaller than said biasing force of said pushing member and larger than said biasing force of said second biasing member when in said clutch engaged position.

13. A vehicle as set forth in claim 12, further comprising:
a friction compensation mechanism for providing a constant clutch release margin in said second clutch disk assembly.

14. A vehicle as set forth in claim 11, further comprising:
a friction compensation mechanism for providing a constant clutch release margin in said second clutch disk assembly.

15. A vehicle as set forth in claim 12, wherein
said engagement member includes a pin having a first end fixedly coupled to said pressure plate, a body portion extending through said intermediate plate toward said flywheel and a second end provided with a head portion larger in diameter than said body portion; and
said intermediate plates have a sleeve with a first end adapted to contact with said pressure plate and a second end adapted to engage with said head portion of said pin, said sleeve being pressure-inserted into a through-hole in said intermediate plate with said pin located within said sleeve such that said sleeve is axially movable by a pressing force of said pressing member and axially non-movable by said biasing forces of said first and third biasing members.

16. A vehicle as set forth in claim 15, wherein
said biasing forces of said first biasing member, said second biasing member, and said third biasing member are predetermined relative to each other such that said intermediate plate moves at a speed that is slower than the moving speed of said pressure plate when said pressure plate starts moving.

17. A vehicle as set forth in claim 16, wherein
said sleeve has a spring seat on an end facing said flywheel; and said pin and said spring seat are disposed such that there is a predetermined axial gap between said head portion of said pin and said spring seat when said pressure plate is closest to said flywheel.

18. A vehicle as set forth in claim 17, wherein
said intermediate plate further includes a plurality of projections on an outer periphery that are engaged with said control assembly.

19. A vehicle as set forth in claim 15, wherein
said sleeve has a spring seat on an end facing said flywheel; and said pin and said spring seat are disposed such that there is a predetermined axial gap between said head portion of said pin and said spring seat when said pressure plate is closest to said flywheel.

20. A vehicle as set forth in claim 19, wherein
said intermediate plate further includes a plurality of projections on an outer periphery that are engaged with said control assembly.

* * * * *